(12) United States Patent
Hosoi et al.

(10) Patent No.: US 7,898,125 B2
(45) Date of Patent: Mar. 1, 2011

(54) ELECTRIC MOTOR AND METHOD OF PRODUCING ELECTRIC MOTOR

(75) Inventors: Keiichi Hosoi, Isesaki (JP); Tsugio Yokoo, Isesaki (JP); Masato Iwata, Kiryu (JP)

(73) Assignee: Mitsuba Corporation, Kiryu-shi (JP)

( * ) Notice: Subject to any disclaimer, the term of this patent is extended or adjusted under 35 U.S.C. 154(b) by 316 days.

(21) Appl. No.: 11/920,765

(22) PCT Filed: May 19, 2006

(86) PCT No.: PCT/JP2006/310034
§ 371 (c)(1),
(2), (4) Date: Nov. 20, 2007

(87) PCT Pub. No.: WO2006/126458
PCT Pub. Date: Nov. 30, 2006

(65) Prior Publication Data
US 2009/0015082 A1 Jan. 15, 2009

(30) Foreign Application Priority Data
May 25, 2005 (JP) .............................. 2005-152727

(51) Int. Cl.
*H02K 9/06* (2006.01)
(52) U.S. Cl. .......................................... 310/52; 310/58
(58) Field of Classification Search ................... 310/58, 310/52, 59, 65
See application file for complete search history.

(56) References Cited

U.S. PATENT DOCUMENTS

| | | | | |
|---|---|---|---|---|
| 6,798,098 B1 * | 9/2004 | Tai | ........................... | 310/67 R |
| 6,815,849 B2 * | 11/2004 | Serizawa et al. | .............. | 310/62 |
| 7,122,924 B2 * | 10/2006 | Lee | ................ | 310/62 |
| 2003/0071525 A1 * | 4/2003 | Tong et al. | ................... | 310/65 |

FOREIGN PATENT DOCUMENTS

| | | |
|---|---|---|
| JP | U 02-065074 | 5/1990 |
| JP | A 2003-009456 | 1/2003 |

* cited by examiner

*Primary Examiner*—Burton Mullins
*Assistant Examiner*—Naishadh N Desai
(74) *Attorney, Agent, or Firm*—Oliff & Berridge, PLC

(57) ABSTRACT

In a fan motor 1 for a vehicle, when opening a vent hole 11 in a cylinder bottom portion 2a of a yoke 2 of the fan motor 1, this is performed so that the opening part cannot be visually observed when the vent hole 11 is viewed head on.

The vent hole 11 is formed by dividing the same at a laterally long dividing line so that, at a dividing line X having an angular shape whose left-right direction central portion intrudes into the side of a vent hole upper half portion 12, the upper half portion 12 has a spherical shape that bulges out to the outside of a bottom surface as it is further at the lower side and thus has an inside and outside staggered form with respect to a lower half portion 13.

15 Claims, 4 Drawing Sheets

ELECTRIC MOTOR AND METHOD OF PRODUCING ELECTRIC MOTOR

This application is the U.S. National Stage of PCT/JP2006/310034, filed May 19, 2006, which claims priority from JP2005-152727, filed May 25, 2005, the entire disclosures of which are incorporated herein by reference hereto.

BACKGROUND

The present invention relates to an electric motor.

There exists electric motors that include a vent hole that is open in order to improve a cooling effect at a cylinder bottom portion of a yoke having a cylindrical shape with a bottom. When this vent hole is provided as a simple opening formed by punching with a press or the like, there is a problem in that water, such as rain water, intrudes into the motor through the opening.

In order to solve this problem, the vent hole is provided with a slit that is long in the right-and-left direction, and is structured to be staggered inside and outside. An upper long side portion of the slit protrudes to the outside of the casing and a lower long side portion of the slit is sunk into the inside of the casing. This structure prevents water intrusion from the outside as the upper long side portion acts as a projecting overhang (i.e., an eaves structure) (see Japanese Published Unexamined Patent Application No. 2003-9456, for example).

SUMMARY

Because of the eaves structure where the upper and lower long side portions of the vent hole are formed as being staggered inside and outside, an open slit can be observed when the vent hole is viewed head on. Indeed, the slit substantially includes a large opening area because it is staggered inside and outside. This structure is thus inferior in its waterproof properties. Besides, in the course of forming such a vent hole, cutting chips are produced and two press working processes are required for punching the slit and shaping the upper and lower long side portions. Workability is thus deteriorated, wherein exists a problem to be solved by the present invention, and well as other problems. The present invention can also achieve various advantages.

The disclosure addresses an exemplary aspect of an electric motor a yoke having a cylindrical form and a vent hole at a cylinder bottom portion of the yoke, wherein the vent hole is formed at the cylinder bottom portion by forming an upper half portion of the vent hole by cutting and stretching out toward an outside of the yoke with respect to a lower half portion so as to bulge out of the cylinder bottom portion.

In another exemplary aspect, the vent hole is divided at a laterally long dividing line such that the upper half portion of the vent hole bulges out of the cylinder bottom portion and has an inside and outside staggered form with respect to the lower half portion.

In another exemplary aspect, the upper half portion has a spherical shape that bulges out more toward the outside closer to a lower side of the upper half portion.

In another exemplary aspect, the dividing line has an angular shape with right-and-left direction central portions intruding into a side of the upper half portion.

In a method for manufacturing an electric motor, a vent hole is opened at a cylinder bottom portion of a yoke having a cylindrical form, wherein the vent hole is formed at the cylinder bottom portion by forming an upper half portion of the vent hole by cutting and stretching out toward an outside of the yoke with respect to a lower half portion so as to bulge out of the cylinder bottom portion.

According to various exemplary aspects of the disclosure, the vent hole is provided in a staggered form where an upper half portion of the vent hole is located outside and a lower half portion is located inside, so that waterproof properties can be enhanced.

According to various exemplary aspects of the disclosure, because the vent hole is formed while being divided at the dividing line long in right-and-left directions in the inside and outside staggered form, there is no case where the slit is visually observed when the vent hole is viewed head on, as is often the case with the conventional art. Waterproof properties thus can be enhanced.

According to various exemplary aspects of the disclosure, while the vent hole is formed by a division at the dividing line, a sufficient ventilation area can be secured.

According to various exemplary aspects of the disclosure, water running down from the right-and-left direction central portion that has a large ventilation area is to be guided by an inclined left and right side portions in order to flow downward. Waterproof properties thus can be further enhanced.

BRIEF DESCRIPTION OF THE DRAWINGS

Various embodiments of the invention will be described with reference to the drawings, wherein.

DETAILED DESCRIPTION OF EMBODIMENTS

Figure 1:
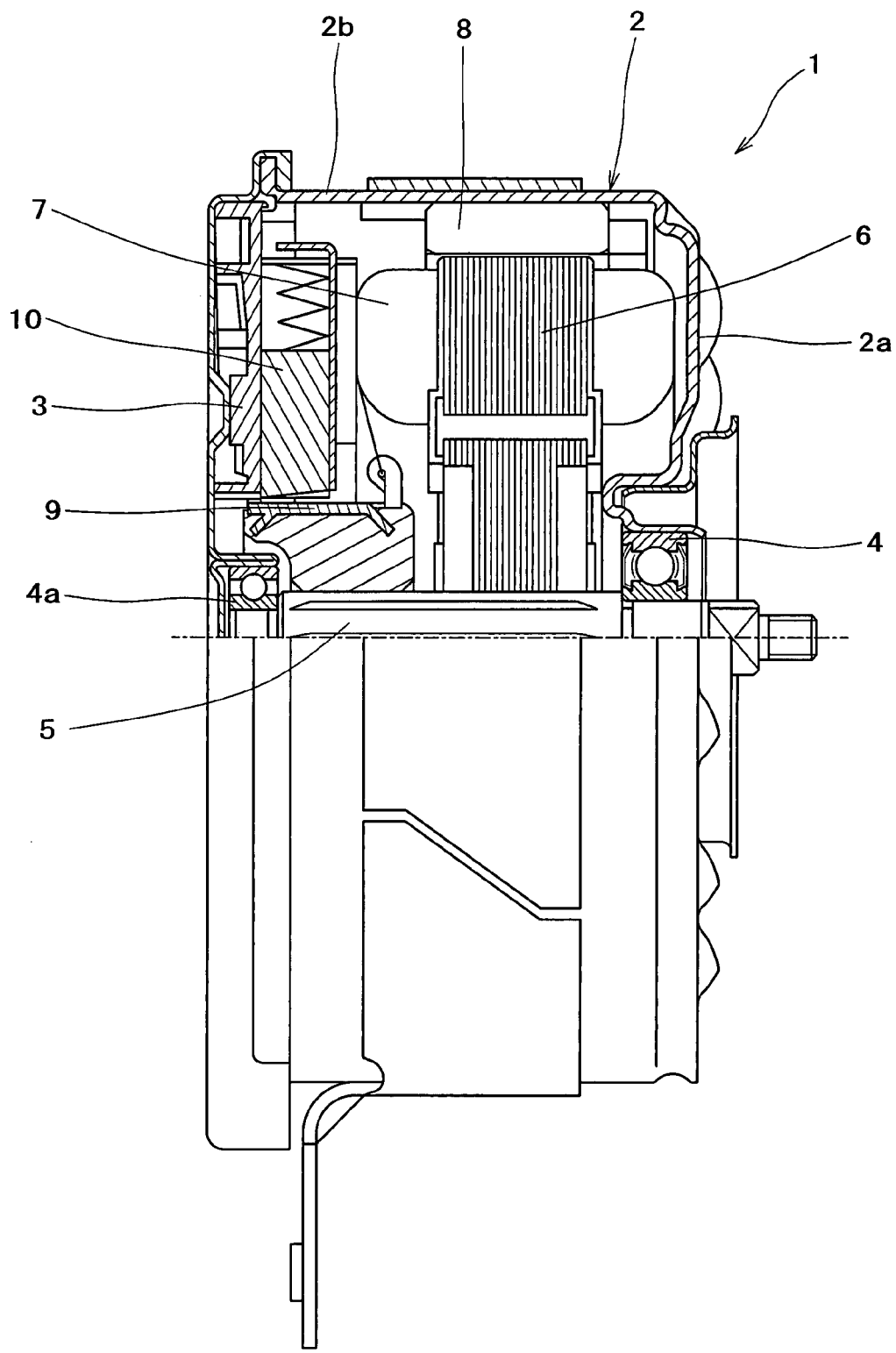
FIG. 1 is a partially sectional side view of an electric motor.
Figure 2:
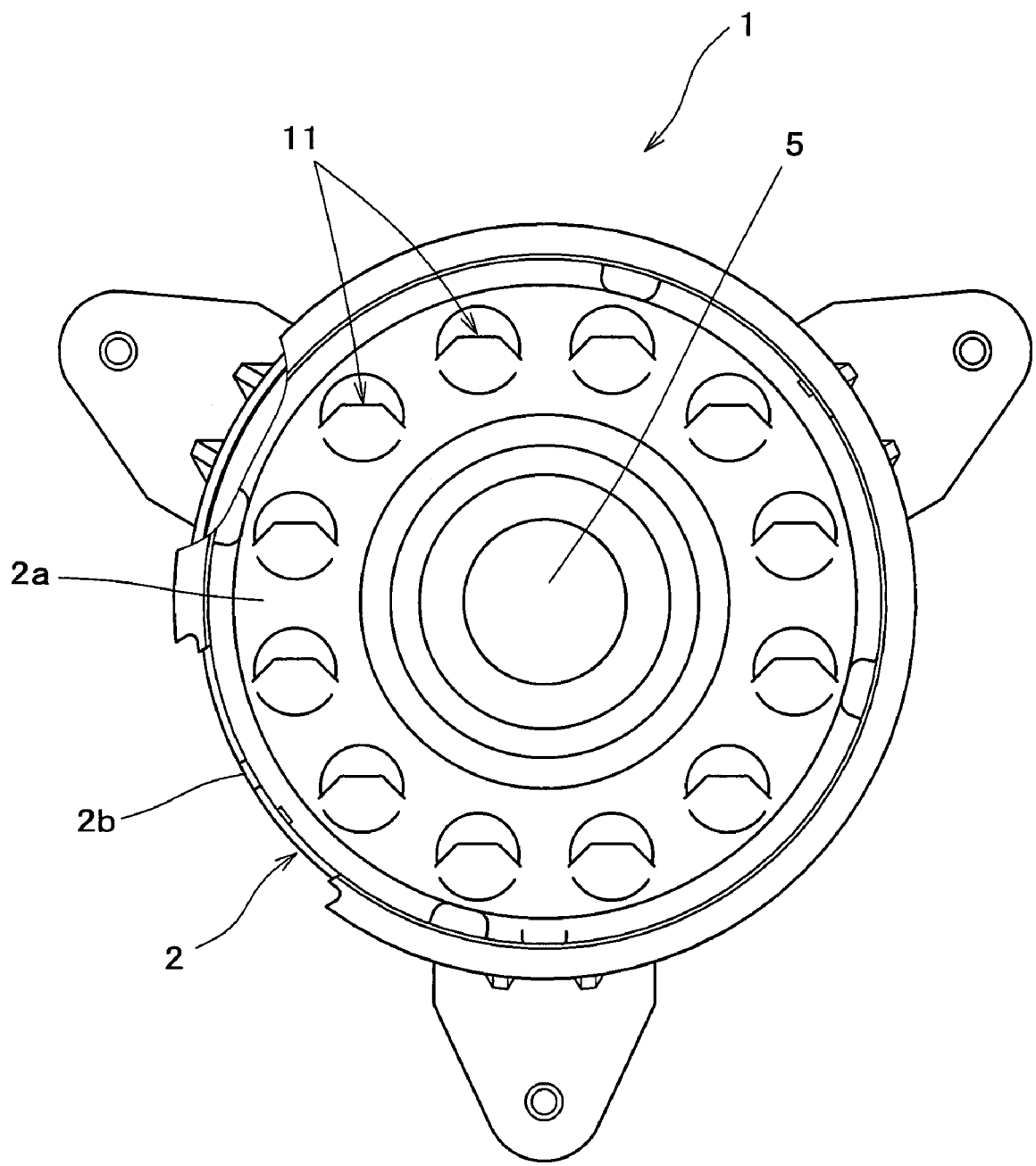
FIG. 2 is a front view of an electric motor.

Embodiments of the present invention will be described based on the drawings. In FIG. 1 and FIG. 2, reference numeral 1 denotes an electric motor for a radiator fan. The electric motor 1 comprises a yoke 2 having a cylindrical shape (i.e., a cylinder body) with a bottom (to be described later); an end bracket 3 blocking an opening of the yoke 2; an armature core shaft 5 supported so as to be freely rotatable via bearings 4 and 4a between a yoke cylinder bottom portion 2a and the end bracket 3; an armature core 6 immovably attached to the armature core shaft 5; a coil 7 wound around the armature core 6; a permanent magnet 8 immovably attached to the inside of a yoke circumferential surface portion 2b; and various other members, such as a commutator 9 and a brush 10.

Figure 3:
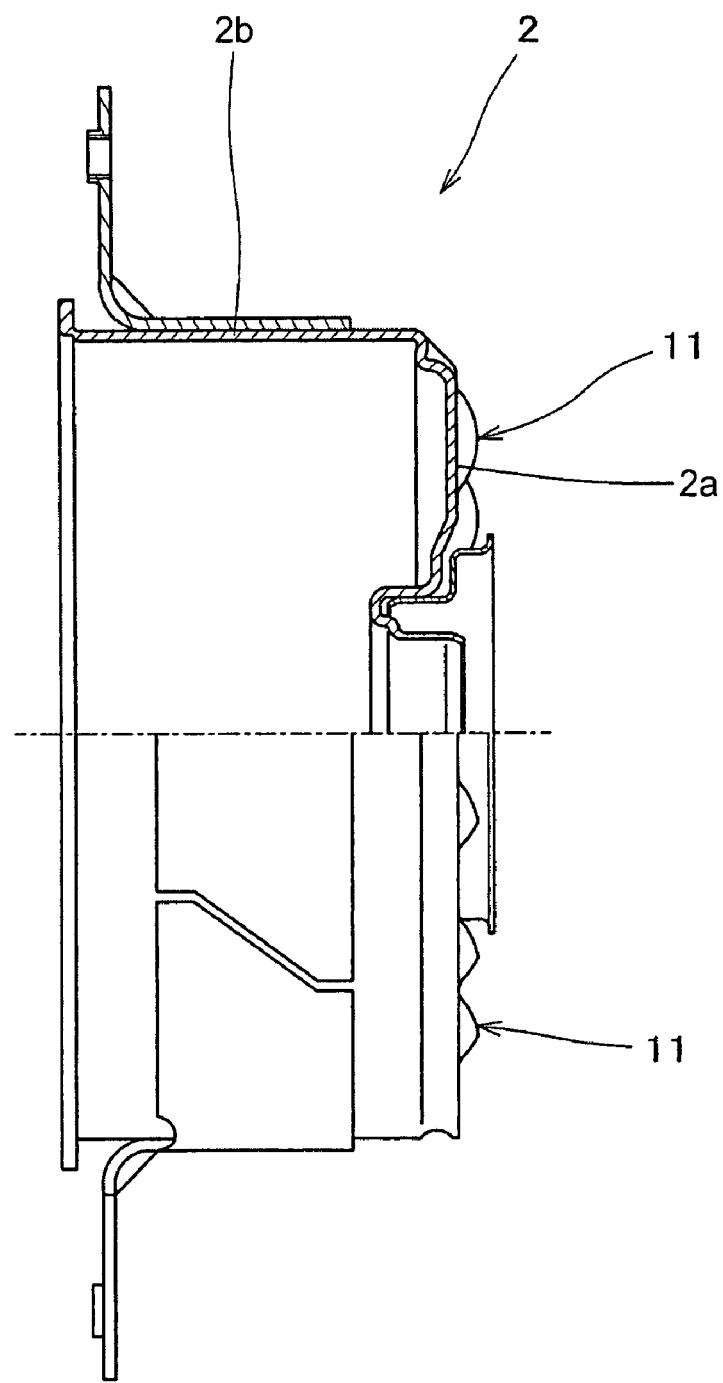
FIG. 3 is a partially sectional side view of a yoke.

On the yoke cylinder bottom portion 2a, a plurality of vent holes 11 of the present invention are formed in a direction around the armature core shaft 5 as a shaft core in a scattered manner (see FIG. 2 and FIG. 3). The vent hole 11 is formed in a space between an upper long side portion of an upper half portion 12 and a lower long side portion of a lower half portion 13 that are provided by dividing (shearing) top from bottom so as to be long in the right and left direction (see FIGS. 4B and 4C).

Figure 4A:
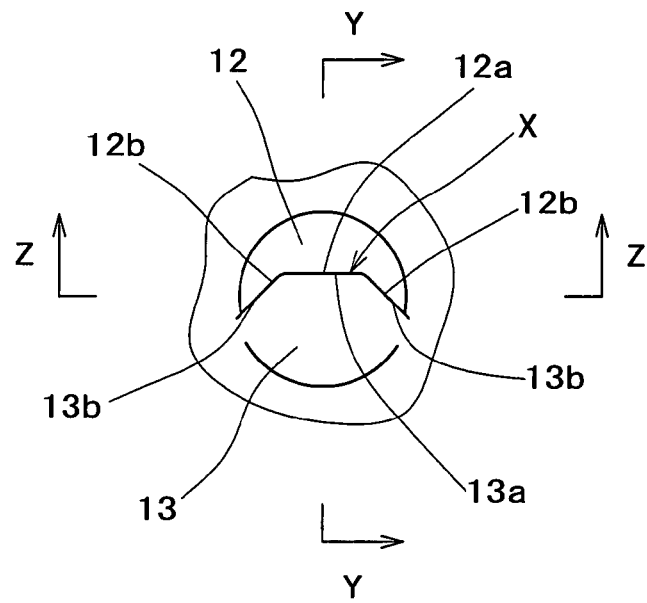
FIG. 4A is a front view of a vent hole.

A dividing line X of the vent hole 11 has an angular shape (see FIG. 4A). For a horizontal shape of the line, a part where right-and-left direction central side portions 12a, 13a of the upper and lower long side portions are formed intrudes into a side of the upper half portion 12. For a slanted shape of the line, parts where left and right side portions 12b, 13b of the upper and lower long side portions are formed inclined toward lower end sides.

Figure 4B:
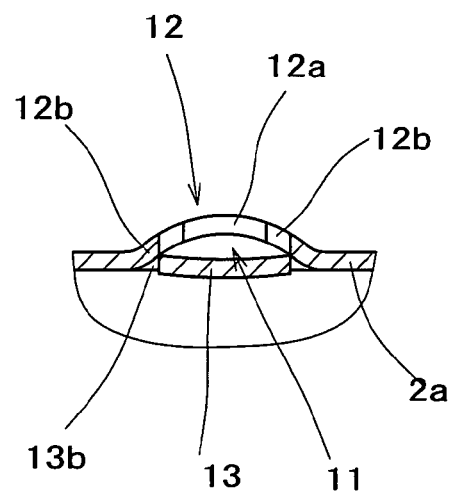
FIG. 4B is a sectional view along Z-Z in FIG. 4A.
Figure 4C:
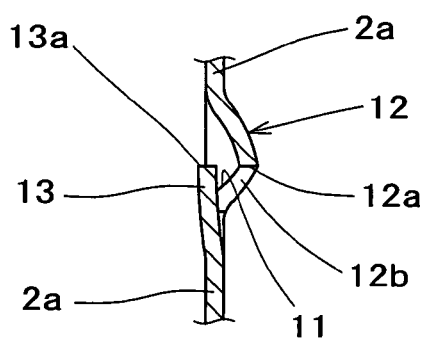
FIG. 4C is a sectional view along Y-Y in FIG. 4A.

Divided in a manner following the dividing line X, staggered inside and outside, the upper half portion 12 is formed in a spherical (bowl-like) shape so as to bulge out more toward the outside of the yoke cylinder bottom portion 2a closer to the lower side and the lower half portion 13 is formed so as to, although slightly, sink in more toward the inside of the yoke cylinder bottom portion 2a closer to the upper side (see FIG. 4B, 4C). This sort of division shaping can be performed by a one time press working without producing cutting chips, when the upper half portion 12 is formed by cutting and stretching out to the outside with respect to the lower half portion 13.

In the present embodiment constructed as described, the vent hole 11 reaches, as a result of forming the upper half portion 12 by cutting and stretching out to the outer lower side with respect to the lower half portion 13, a condition where the upper half portion 12 formed at the upper side of the dividing line X bulges out of the yoke cylinder bottom portion 2a further than the lower half portion 13 at a border of the dividing line X in the left and right direction and has an inside and outside staggered form with respect to the lower half portion 13.

The vent hole 11 is also formed such that only the dividing line X is observed when the yoke cylinder bottom portion 2a is viewed head on as in FIG. 2. There is no such case where the opening is itself visually observed as in the conventional art where a cutaway opening is simply shaped so as to be staggered inside and outside. With the vent holes 11 of the present invention, waterproof properties can be improved. Moreover, for the vent hole 11 to be open, cutting and stretching out the upper half portion 12 toward the outer lower side with respect to the lower half portion 13 enables the dividing line X and processing of the upper half portion 12 and the lower half portion 13. No such cutting chips are produced when an opening is provided as in the conventional structure. This division shaping can be performed by a one time press working, and workability is thus improved.

Moreover, because the upper half portion 12, which bulges out of the cylinder bottom, has a spherical shape that bulges out further toward the outside from the cylinder bottom portion 2a closer to the lower side of the upper half portion 12, a sufficient ventilation area also can be secured when the vent hole 11 is formed by the division at the dividing line X.

Furthermore, because the dividing line X has an angular shape with right-and-left direction central side portions 12a, 13a intruding into a side of the upper half portion 12, water running down from the right-and-left direction central side portions 12a, 13a that has a large ventilation flows down while being guided by the inclined left and right side portions 12b, 13b. Therefore, waterproof properties can be further enhanced.

The present invention is not limited to the above embodiment. A bulging-out shape of an upper half portion of a vent hole can also be carried out in some other appropriate shape such as conical. It is also preferable, but not always necessary, to make a lower half portion of a vent hole sink into an inside further than a cylinder bottom surface. In short, it should be sufficient that a lower half portion has an inside and outside staggered form with respect to an upper half portion.

The present invention is useful for an electric motor such as an electric motor of a radiator fan. In an electric motor for which a vent hole for improving the cooling effect is formed at a cylinder bottom portion of a yoke having a cylindrical shape with a bottom, by opening the vent hole in a staggered form whose upper half portion is located outside and whose lower half is located inside, a sufficient ventilation area can be secured and waterproof properties can be enhanced. Moreover, the forming process of the vent hole can be simplified.

What is claimed is:

1. An electric motor, comprising:
   a yoke having a cylindrical shape with a bottom;
   an end bracket blocking an opening of the yoke;
   an armature core shaft supported so as to be freely rotatable via bearings between a yoke cylinder bottom portion and the end bracket, the yoke cylinder bottom portion being longitudinally mounted, wherein:
   a plurality of vent holes are formed on the yoke cylinder bottom portion in a direction around the armature core shaft as a shaft core in a scattered manner,
   all of the plurality of vent holes are formed at the yoke cylinder bottom portion by forming an upper half portion of the vent hole by cutting and stretching out toward an outside of the yoke with respect to a lower half portion so as to bulge out of the yoke cylinder bottom portion and divided at a right-and-left direction dividing line, and
   the right-and-left direction dividing line has a horizontal shape with right-and-left direction central portions intruding into a side of the upper half portion and an angular shape with right-and-left side portions inclining toward lower end sides.

2. The electric motor according to claim 1, wherein the upper half portion of the vent hole bulges out of the yoke cylinder bottom portion and has an inside and outside staggered form with respect to the lower half portion.

3. The electric motor according to claim 1, wherein the upper half portion has a spherical shape that bulges out more toward the outside closer to a lower side of the upper half portion.

4. A method for manufacturing an electric motor that includes a yoke having a cylindrical shape with a bottom; an end bracket blocking an opening of the yoke; and an armature core shaft supported so as to be freely rotatable via bearings between a yoke cylinder bottom portion and the end bracket, the yoke cylinder bottom portion being longitudinally mounted, the method comprising:
   opening a plurality of vent holes on the yoke cylinder bottom portion in a direction around the armature core shaft as a shaft core in a scattered manner, wherein:
   all of the plurality of vent holes are formed at the yoke cylinder bottom portion by forming an upper half portion of the vent hole by cutting and stretching out toward an outside of the yoke with respect to a lower half portion so as to bulge out of the yoke cylinder bottom portion and divided at a right-and-left direction dividing line, and
   the right-and-left direction dividing line has a horizontal shape with right-and-left direction central portions intruding into a side of the upper half portion and an angular shape with right-and-left side portions inclining toward lower end sides.

5. The electric motor according to claim 2, wherein the upper half portion has a spherical shape that bulges out more toward the outside closer to a lower side of the upper half portion.

6. The method according to claim 4, wherein the upper half portion of the vent hole bulges out of the yoke cylinder bottom portion and has an inside and outside staggered form with respect to the lower half portion.

7. The method according to claim 4, wherein the upper half portion has a spherical shape that bulges out more toward the outside closer to a lower side of the upper half portion.

8. The method according to claim 6, wherein the upper half portion has a spherical shape that bulges out more toward the outside closer to a lower side of the upper half portion.

9. The electric motor according to claim 1, wherein the vent hole is formed such that only the right-and-left direction dividing line is observed and the vent hole in itself is not observed when the yoke cylinder bottom portion is viewed head on.

10. The method according to claim 4, wherein the vent hole is formed such that only the right-and-left direction dividing line is observed and the vent hole in itself is not observed when the yoke cylinder bottom portion is viewed head on.

11. The electric motor according to claim 1, wherein the lower half portion is formed so as to slightly sink in more toward an inside of the yoke closer to an upper side of the lower half portion.

12. The method according to claim 4, wherein the lower half portion is formed so as to slightly sink in more toward an inside of the yoke closer to an upper side of the lower half portion.

13. A yoke, comprising:
a cylinder body with a plurality of vent holes formed at a cylinder bottom portion of the cylinder body in a scattered manner, wherein:
all of the plurality of vent holes are formed at the cylinder bottom portion by forming an upper half portion of the vent hole by cutting and stretching out toward an outside of the cylinder body with respect to a lower half portion so as to bulge out of the cylinder bottom portion and divided at a right-and-left direction dividing line, and
the right-and-left direction dividing line has a horizontal shape with right-and-left direction central portions intruding into a side of the upper half portion and an angular shape with right-and-left side portions inclining toward lower end sides.

14. The electric motor according to claim 1, wherein an amount by which the upper half portion extends outward is more than an amount by which the lower half portion extends inward.

15. The method according to claim 4, wherein an amount by which the upper half portion extends outward is more than an amount by which the lower half portion extends inward.

* * * * *